US010129102B2

(12) United States Patent
Grinkemeyer (10) Patent No.: US 10,129,102 B2
(45) Date of Patent: Nov. 13, 2018

(54) SERVICE BASED TESTING (71) Applicant: Spirent Communications, Inc., San Jose, CA (US)

(72) Inventor: Douglas Grinkemeyer, Germantown, MD (US)

(73) Assignee: Spirent Communications, Inc., San Jose, CA (US)

( * ) Notice: Subject to any disclaimer, the term of this patent is extended or adjusted under 35 U.S.C. 154(b) by 2 days.

(21) Appl. No.: 15/592,173

(22) Filed: May 10, 2017

(65) Prior Publication Data

US 2017/0331707 A1    Nov. 16, 2017

Related U.S. Application Data

(60) Provisional application No. 62/334,873, filed on May 11, 2016.

(51) Int. Cl.
*H04L 12/28* (2006.01)
*H04L 12/24* (2006.01)
*H04H 20/12* (2008.01)
*H04L 12/26* (2006.01)
*H04W 84/12* (2009.01)

(52) U.S. Cl.
CPC ......... *H04L 41/5038* (2013.01); *H04H 20/12* (2013.01); *H04L 43/0829* (2013.01); *H04L 43/0835* (2013.01); *H04L 43/0852* (2013.01); *H04L 43/50* (2013.01); *H04W 84/12* (2013.01)

(58) Field of Classification Search
CPC ..... H04L 47/10; H04L 63/0892; H04L 63/10; H04L 12/14; H04L 12/22; H04L 45/308; H04L 61/25
See application file for complete search history.

(56) References Cited

U.S. PATENT DOCUMENTS

| | | | |
|---|---|---|---|
| 7,212,490 B1 * | 5/2007 | Kao ...................... | H04L 12/42 370/222 |
| 8,040,901 B1 * | 10/2011 | Kompella ............. | H04L 12/437 370/395.71 |
| 2010/0020685 A1 * | 1/2010 | Short ...................... | H04L 12/14 370/230 |
| 2013/0279333 A1 * | 10/2013 | Aharbi ............. | H04L 12/40136 370/232 |

* cited by examiner

*Primary Examiner* — Sai Aung
(74) *Attorney, Agent, or Firm* — Haynes Beffel & Wolfeld LLP; Ernest J. Beffel, Jr.

(57) ABSTRACT

Some tests can be implemented as services. A network provider can deploy ("push") a test to a container resident on one or more devices of the network, either at installation, periodically, or when a problem is reported. When a customer reports an issue, services running on one or more devices of the customer's installation can cause the containerized tests to be run. For example, the central office of the network provider can initiate a request to run the test through the internet (or other connection) by the container. In some implementations, there is an overlap of the service based test set with traditional technician initiated test sets forming a hybrid testing architecture.

23 Claims, 9 Drawing Sheets

SERVICE BASED TESTING

RELATED APPLICATIONS

This application claims the benefit of U.S. Provisional Patent Application No. 62/334,873, entitled "SERVICE BASED TESTING", filed on May 11, 2016, which is hereby incorporated by reference for all purposes.

U.S. Provisional Patent Application No. 62/334,873 entitled "SERVICE BASED TESTING", filed on May 11, 2016 is related to U.S. Provisional Patent Application No. 62/307,392, entitled "SYSTEMS AND METHODS FOR AUTOMATED TESTING OF MOCA NETWORKS", of Mar. 11, 2016, which is hereby incorporated by reference for all purposes.

U.S. Provisional Patent Application No. 62/334,873 entitled "SERVICE BASED TESTING", filed on May 11, 2016 is related to U.S. Pat. No. 8,146,125, entitled "COMPUTERIZED DEVICE AND METHOD FOR ANALYZING SIGNALS IN A MULTIMEDIA OVER COAX ALLIANCE (MOCA) NETWORK AND SIMILAR TDM/ENCRYPTED NETWORKS" of Mar. 27, 2012, which is hereby incorporated by reference for all purposes.

U.S. Provisional Patent Application No. 62/334,873 entitled "SERVICE BASED TESTING", filed on May 11, 2016 is related to U.S. patent application Ser. No. 13/353,026, entitled "SYSTEMS AND METHODS FOR EVALUATING CUSTOMER PREMISES NETWORKS", of Jan. 18, 2012, which is hereby incorporated by reference for all purposes.

BACKGROUND

The proliferation of home network installations has driven adoption of Multimedia over Coax Alliance (MoCA) networks. Such network architectures bring with them new and special needs for installation and testing. For example, conducting testing on home network installations using traditional methods involves dispatching technicians to the home, necessitating not just a highly skilled labor force, but the ability to schedule convenient times for the homeowner in order to enter the premises and conduct testing and repair. This can be time consuming, inconvenient and expensive for both the network operator and the homeowner. There simply needs to be a better way to conduct testing of on-premises installed networks.

SUMMARY

Some tests can be implemented as services. A network provider can deploy ("push") a test to a container resident on one or more devices of the network, either at installation, periodically, or when a problem is reported. When a customer reports an issue, services running on one or more devices of the customer installation can cause the containerized tests to be run. For example, the central office of the network provider can initiate a request to run the test through the internet (or other connection) by the container. In some implementations, the container acts as a recipient for test set(s) deployed or provisioned either before customer installation or on premise or both. In some implementations, there is an overlap of the service based test set with traditional technician initiated test sets forming a hybrid testing architecture.

Implementations can provide the capability to build, ship, and run distributed applications anywhere accessible by networks. In implementations, containers are isolated, but share OS (hypervisor not necessary). In some implementations home network information is collected preemptively to form a baseline. Implementations can reduce onsite service calls, and/or reduce time-to-resolve problems by personnel dispatched to the installation site.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

DETAILED DESCRIPTION

Introduction

Historically, cable delivery of home entertainment has involved the use of MPEG video transport. Cable television providers encode and transmit cable channels using quadrature amplitude modulation (QAM) over coaxial cable or "coax". As IP-based packet traffic becomes more integrated with video devices in the home, new standards, such as those created by the MoCA organization, have been developed to take advantage of this integration. MoCA is a technology that allows a coax network to carry additional signals that travel on a frequency band mostly unused by cable TV transmissions.

Tens of millions of homes have been equipped with MoCA technology, and the number continues to grow. The increasing demands for network bandwidth in the home, for applications such as high definition (HD) television, interactive gaming, video on demand (VOD) and digital video recorders (DVR), requires increasingly complex in-home networking. Technologies such as MoCA and data over cable service interface specification (DOCSIS) are being implemented to address these demands. However, incompatibilities between competing technologies and inevitable failure of active and passive devices create a need for expert knowledge in the field to maintain and repair equipment. This growing need challenges technical support organizations. It will be impractical to scale a support workforce possessing the technical competence currently required to service this growing infrastructure.

On premises testing methods typically entail technicians using special purpose devices visiting the installation to measure the contributions of various packet errors to signal degradation, including packet loss, jitter, and latency. These devices made it possible to monitor traffic between two active devices, tap into the line to measure throughput, and provide raw statistics to technically trained personnel. Technicians with strong technical insight were capable of deciphering the statistics delivered and determining what actions to take to identify and repair faults in a home network. One such example device, used to test MoCA signals routed to a set-top-box and evaluate performance of the set-top-box, employs portions of the technology disclosed in commonly owned U.S. Pat. No. 8,146,125 entitled, "Computerized Device and Method for Analyzing Signals in a Multimedia over Coax Alliance (MoCA) Network and Similar TDM/Encrypted Networks" which is hereby incorporated by reference for all purposes.

The disclosed technology describes a Configurable Test Subsystem in which tests can be implemented as services, e.g., a cable company has a customer with an issue, and the services running in "Docker" (or similar technology) containers can be invoked to perform testing and provide results for analysis to a central office of the cable company, for example. Containers are useful to encapsulate processes and the filesystem environment of the process—enabling the process to be deployed and executed in a variety of environments. (Docker is a product of Docker, Inc. of San Francisco, Calif.).

A request to run the test comes from a central office through the internet into the containers. Alternatively, a local trigger, such as can be provided by a scheduler on board a device, can be used to initiate running a test. In one implementation, the central office will "push" test cases to a container once a problem is reported. Additionally, there are cases where it may be desirable to block PC traffic, in which case the container can receive instructions to block traffic from specific machines. Such techniques can be useful when, for example a network card fails and fills a network with miscellaneous traffic. This can serve as an interim patch until service personnel can come out to replace the card. Devices that are targets for containerized tests can be Linux based.

Example MoCA Home Network

Figure 1:
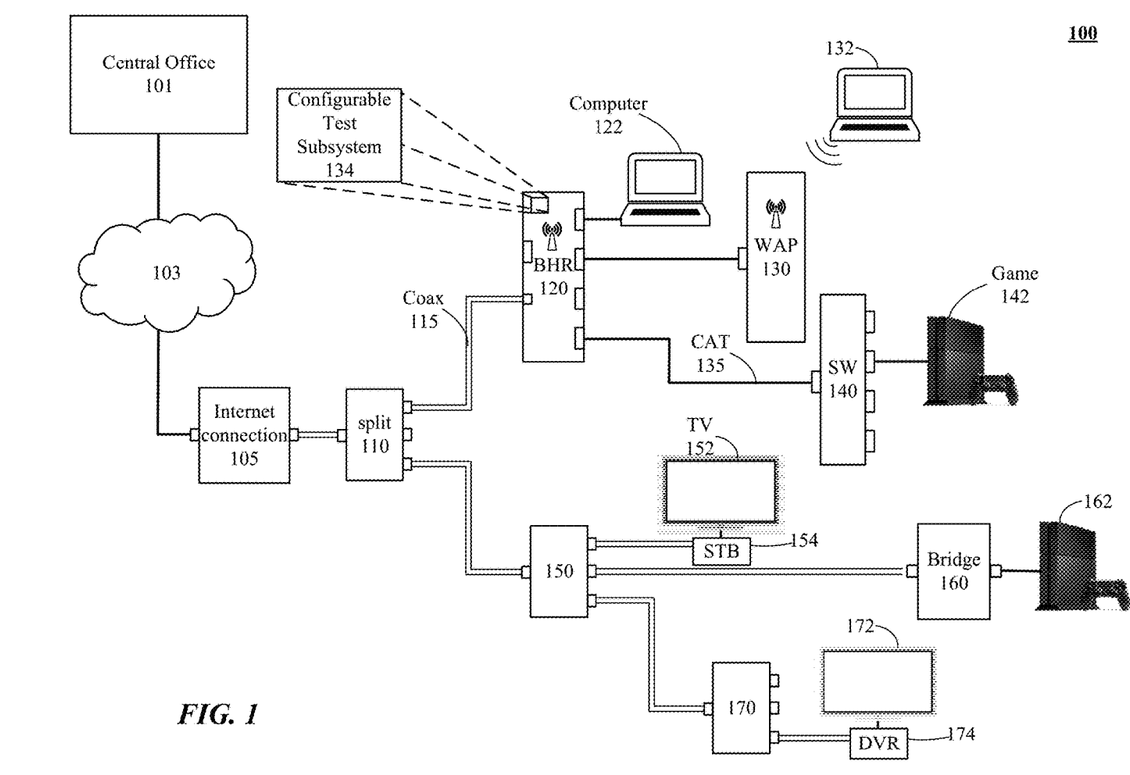
FIG. 1 illustrates a home network with MoCA and wireless components, which the technology disclosed can be used to diagnose.

FIG. 1 illustrates an example home network in which the technology disclosed can be used to find faults or errors. Home networks of this sort offer integrated wired and wireless Ethernet traffic with coax-based MoCA traffic. Problems with MoCA and wireless portions of the network to be diagnosed can include replay of videos stored in a DVR, Ethernet device errors in traffic through a Broadband Home Router (BHR) or Access Point (WAP), and physical layer issues with cabling, connectors and splitters. The environment illustrated in FIG. 1 includes a connection to a Wide Area Network (WAN) 103 with an internet connection 105 and an entry point adapter such as an Optical Network Terminal (ONT) or coax connection. The WAN can be MoCA-compliant. The home MoCA LAN 100 typically includes a coax cable 115, illustrated as double lines between devices, and an Ethernet cable 135, drawn as a single line. The WAN 103 can connect to a Central Office 101 with a head end that exchanges data with the home in-home LAN 100.

The home MoCA LAN 100 includes a Broadband Home Router (BHR) 120 connected through a passive first splitter 110, via a coax cable 115. The BHR is also coupled to the internet connection 105. In one example, the BHR 120 is an Actiontec MI424WR wireless broadband router, which acts as a server for DHCP, NAT, signal decryption, and other common home router services. The BHR 120 can integrate both the Wi-Fi and Ethernet networks with QAM in compliance with MoCA standards.

In this example, a first computer 122 is connected to the BHR 120 by an Ethernet cable. A Wireless Access Point (WAP) 130, that supports wireless technologies such as IEEE 802.11b, a, g, n, and ac, is also connected to the BHR 120 via an Ethernet cable or integrated into the BHR. A second computer 132 is connected wirelessly to the WAP 130 or BHR 120. Similarly, an Ethernet switch 140 can be connected to the BHR 120 via an Ethernet cable 135 or integrated into the BHR. A first gaming system 142 can be connected to the Ethernet switch 140 via an Ethernet cable.

A second splitter 150 can be connected to the first splitter 110 via coax cable, and a Set Top Box (STB) 154 via coax cable. The set top box 154 can be connected to a first television 152 with a technology such as HDMI or Component Video. A MoCA bridge 160 can be connected to the second splitter 150 via coax cable, and to a second gaming system 162 via Ethernet. A third splitter 170 can be connected to the second splitter 150. And a Digital Video Recorder (DVR) 174 can be connected to the third splitter 170 via a coax cable. A second television 172 can then be connected to the DVR 174 with a technology such as HDMI or Component Video.

A Configurable Test Subsystem 134 using the technology disclosed can be inserted into one or more of the devices of the home MoCA LAN 100, which can house individual tests from other device portions in order to facilitate testing of the MoCA LAN 100. While Configurable Test Subsystem 134 is illustrated in FIG. 1 as deployed on BHR 120, the Configurable Test Subsystem 134 can be deployed in any one or selected ones of the first computer 122 with an Ethernet connection, the second computer 132 with a wireless connection, the BHR 120, the WAP 130, a gaming system 142, 162, the STB 154, a TV 152, 172, or the DVR 174.

The Configurable Test Subsystem 134 includes combinations of hardware and software capable of housing one or more tests for testing performance of the home MoCA LAN 100. These tests can be run by the central office 101 of the network provider, either under control of a human operator or an automated process, with the technical results of the tests captured and made available to the central office 101 for analysis. In one scenario, an operator decides whether to run one or more tests, the order that tests are to be run, and the significance of any results obtained by each individual test. Tests can be extremely complicated, with equally complicated results.

In another scenario, the technology disclosed provides for automatically scheduling a test set for the home MoCA LAN 100 housed by the Configurable Test Subsystem 134 based on a scheduling paradigm selected under control of the central office. The technology disclosed can then initiate one or more tests to run autonomously according to a schedule, process the results of the tests, and provide results to an operator back at the home office. Results can instruct the operator as to whether there is a problem in that portion of the home MoCA LAN 100, and potentially whether an on-site follow up visit is required to remediate the problem. Details of the Configurable Test Subsystem 134 are shown in the block diagram illustrated in FIG. 2.

Active and Passive Testing

Testing regimes can include implementations having one or both of active monitoring and passive monitoring of network components, links, devices and the like. Active monitoring typically entails injecting test traffic onto a network and monitoring the flow of that traffic. Active monitoring techniques are especially useful for conducting simple test protocols; for example, timing the latency between two devices on a wide area network, as well as more complex tasks such as collecting measurements to verify quality of service (QoS) agreements are being met. Active monitoring techniques that provide some control over an experimental scenario can enable collection of data on particular aspects of network performance.

Passive monitoring techniques typically involve less control over an experimental scenario and more observation. For example, rather than injecting an artificial traffic flow into an MoCA network under test, passive monitoring techniques can include monitoring traffic that is already present on the network. Passive monitoring techniques are typically conducted using a device on the network to capture network packets for analysis. This can be done using one or more probes configured to capture network data, or with built-in capabilities on switches or other network devices, or combinations thereof. Passive network monitoring can collect large volumes of data which can be used to derive a wide range of information; for example, TCP headers contain information that can be used to derive network topology, identify services and operating systems running on networked devices, and detect potentially malicious activity by hackers or the like.

Configurable Test Subsystem System Stack

Figure 2:
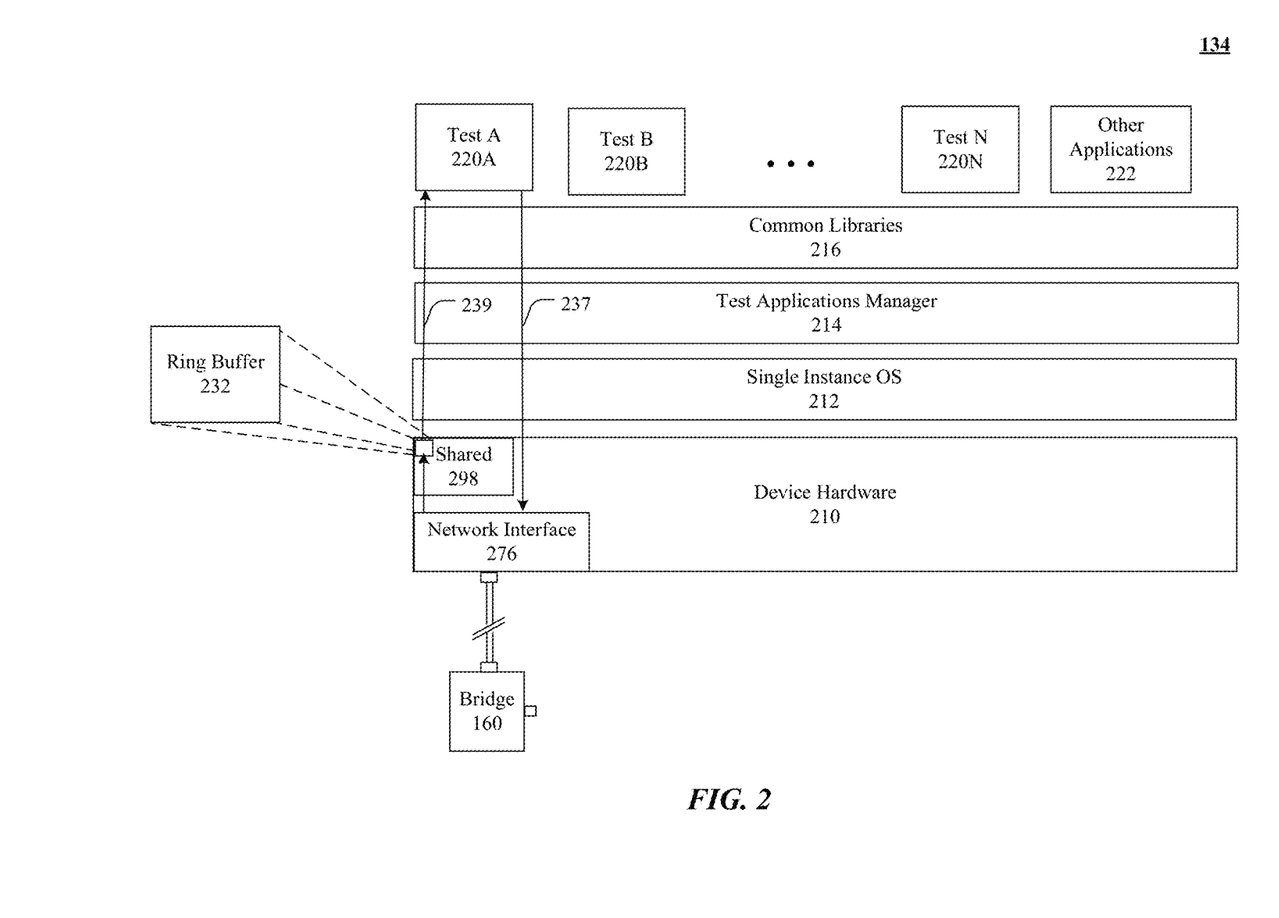
FIG. 2 illustrates a block diagram of configurable test subsystem for an example MoCA device.

FIG. 2 illustrates a block diagram of a configurable test subsystem for an example MoCA device. In FIG. 2, a Configurable Test Subsystem 134 is illustrated with reference to a component portions making up a system stack of the subsystem. Hardware layer 210 includes one or more network connections, processor and memory and various input and output devices. Specific components, interconnections and configurations can vary, however for a more detailed view of one example implementation of hardware 210 components, reference may be had to FIG. 6 herein and accompanying text. Single instance OS 212 resides in storage, transitory and/or non-transitory, and provides control over access to system resources, such as the devices making up hardware layer 210, manages storage and provides resources accessible to other programs and applications of higher layers. A Test Applications Manager 214 is deployed as a part of configurable test subsystem 134 as part of the manufacturing process pre-installation, and enables receiving and installing of test sets, such as test case A 220A, test case B 220B, test case N 220N, etc., as well as other applications 222 that can have non-test related functionality. Test Applications Manager 214 supports common libraries 216 to provide functionality accessible by any of test case A 220A, test case B 220B, test case N 220N, and so forth.

Further with continued reference to FIG. 2, in an example scenario of conducting testing, test case A 220A during execution generates and sends outbound test traffic 237 via OS 212 and network interface 276 of device hardware 210. A second network device 160, reachable by the MoCA, serves as a "target" that receives the outbound test traffic 237 sent by test case A 220A and replies with a response traffic 239. Response traffic 239 is received by network interface 276 and copied into ring buffer 232 residing in a shared memory 298 portion of the device hardware 210. Test case A 220A retrieves response traffic 239 from the ring buffer 232. Direct retrieval of response traffic 239 from the ring buffer 232 in shared memory portion of hardware 210 advantageously provides test case A 220A the capability to circumvent delays from accessing response traffic via system utilities.

For example, and with reference to FIG. 1 and FIG. 2, in order to test connectivity between device BHR 120 and bridge 160, test case A 220A which resides in a container deployed in configurable test subsystem 134 of BHR 120 could generate a "ping" as outbound traffic 237 directed to bridge 160 of the MoCA. Bridge 160 would respond with a ping response, the response traffic 239. Depending on the network conditions, e.g., the "health" of the connections and devices 110 and 150 as well as target device, bridge 160, and originating device BHR 120, the ping response will exhibit a certain latency to traverse the network path. Depending upon the latency measured, and the latency expected, a health of the devices along the path can be inferred. If no ping response is received (timeout) a failure of one or more of these devices is implicated.

While the foregoing has used a relatively simple "ping" test scenario to illustrate the operation of just one example configuration of select devices, other more complex test scenarios are readily incorporated into containerized entities for deployment onto network devices of various types and configurations without significantly departing from the techniques described herein.

Ring Buffer

Figure 3:
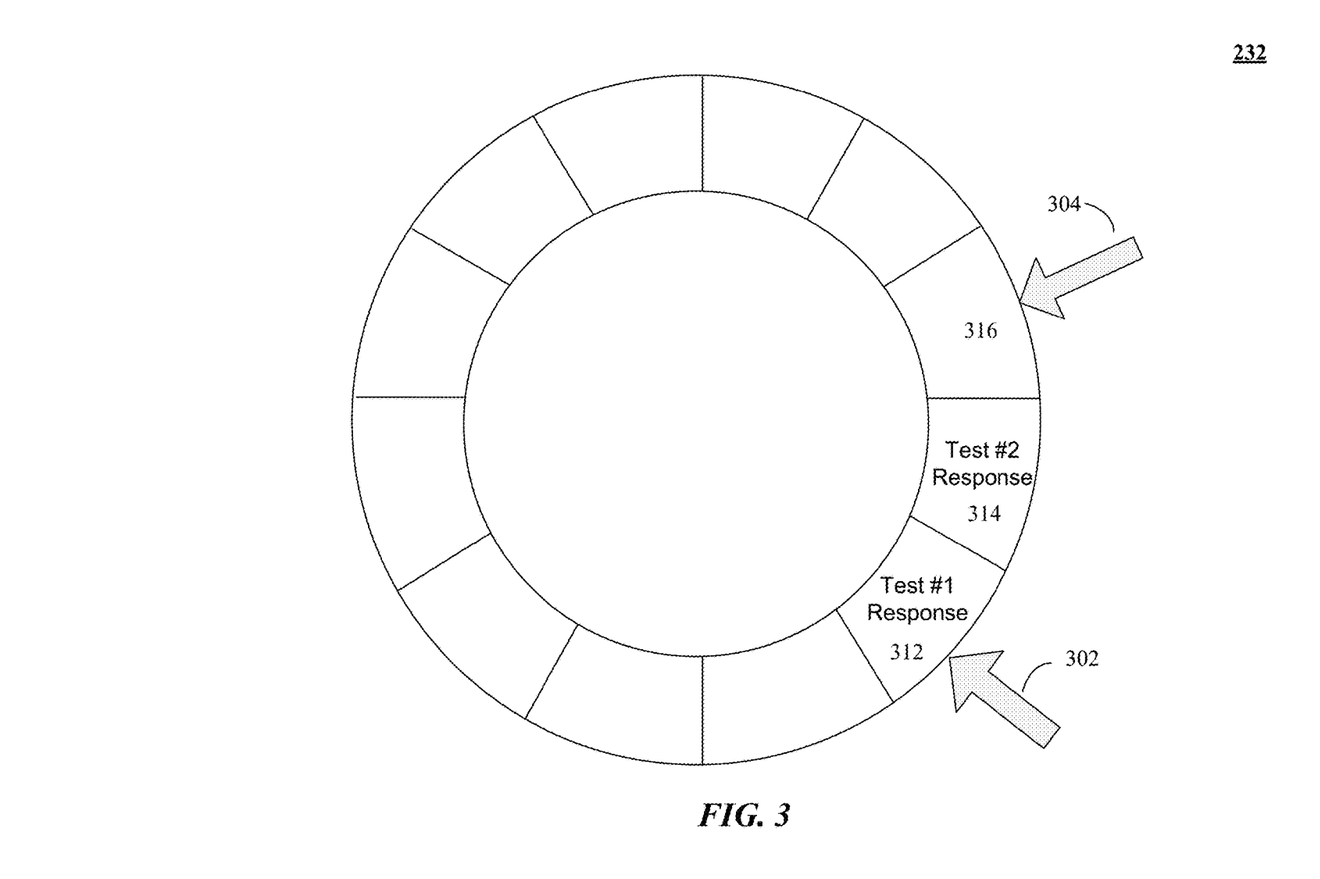
FIG. 3 illustrates a block diagram of a ring buffer for an example MoCA device.

FIG. 3 illustrates a block diagram of a ring buffer for an example MoCA device. Ring buffer 232 of FIG. 3 is depicted schematically and includes a read pointer 302 that points on a next object to be read from the buffer, in this case, a first test result 312. A second test result 314 would be read subsequently in FIFO order, when, after reading the first test result, the ring buffer read pointer 302 is incremented to point on the second test result 314. Ring buffer 232 also includes a write pointer 304 that points on a first empty position 316, into which a next test result can be written. After writing the next test result into position 316, write pointer 304 would also be "incremented" "counter clockwise" to point to the next available location for storing results.

While the foregoing has used a relatively simple "ring" schematic block diagram scenario to illustrate the operation of just one example configuration of shared memory buffer, many complex shared memory configurations not illustrated by FIG. 3 for clarity, such as linked lists, doubly linked lists, queues, and so forth can be used to realize the operation of a circular queue implemented in shared memory space and are readily incorporated into containerized entities for deployment onto network devices of various types and configurations without significantly departing from the techniques described herein.

Test Process Latency Reduction

Figure 4A:
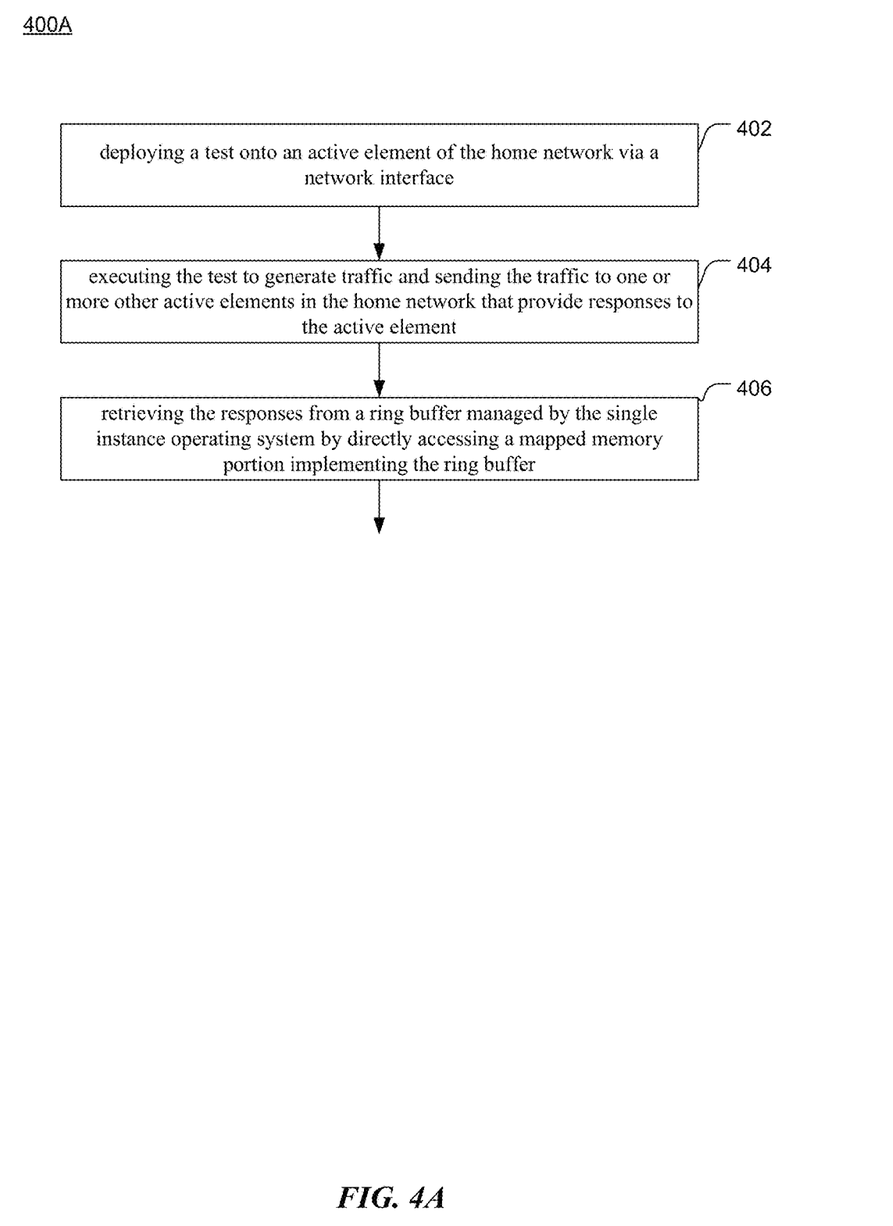
FIG. 4A illustrates a flowchart depicting operation of a containerized test system implementation in an example MoCA network.

FIG. 4A is a flowchart showing a method 400A of removing latency in performance tests conducted on an in home network by deployable containerized tests. Flowchart 400A can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 4A. Multiple actions can be combined in some implementations. For convenience, this flowchart is described with reference to the system that carries out a method. The system is not necessarily part of the method.

At action 402, a test is deployed onto an active element of the home network via a network interface. The test can be containerized into an open platform distributed system container that shares with one or more other containers a single instance of an operating system.

At action 404, the test is executed to generate traffic and to send the traffic to one or more other active elements in the home network that provide responses to the active element.

At action 406, the responses are retrieved from a ring buffer managed by the single instance operating system by directly accessing a mapped memory portion implementing the ring buffer. Retrieving the responses from the ring buffer by directly accessing the mapped memory portion implementing the ring buffer enables the responses to be retrieved with less latency than retrieving responses using system calls.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 5A:
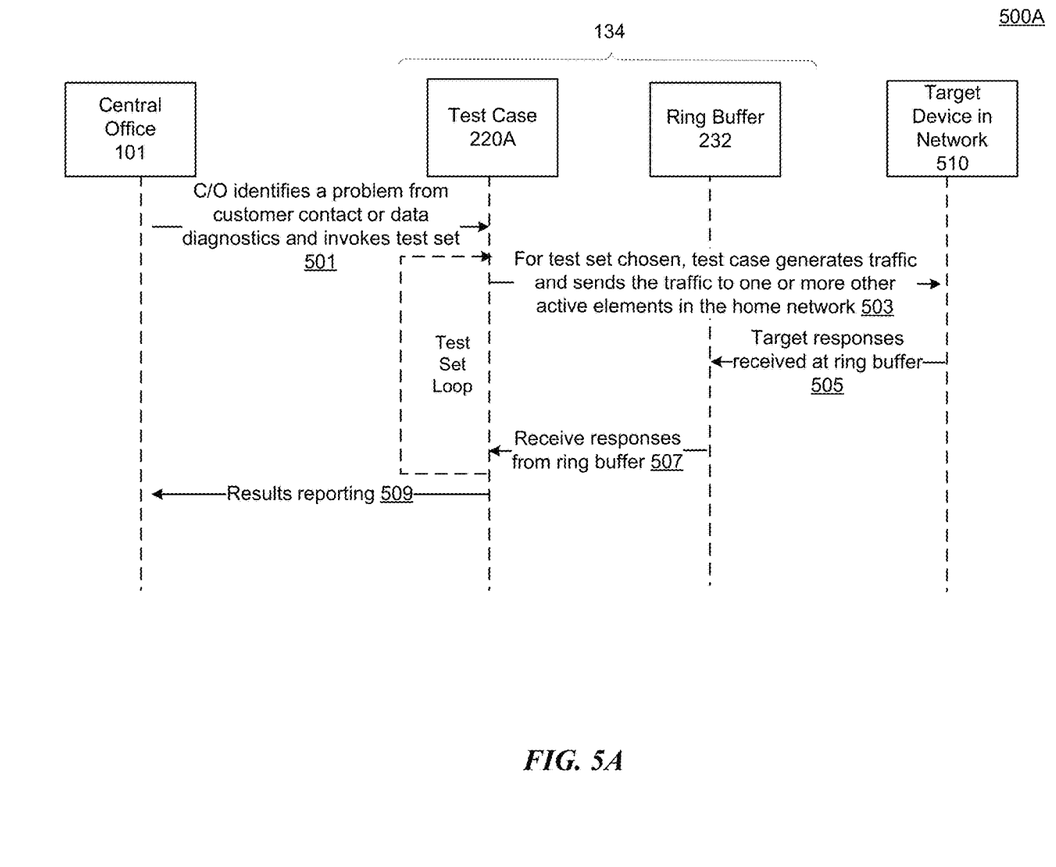
FIG. 5A illustrates one example of messaging during a test.

FIG. 5A illustrates one example 500A of messaging that includes a sequence of messages between a central office 101, a test case 220A, ring buffer 232 and a device under test 510. The Central Office 101 can invoke test cases, such as test case 220A deployed on one or more devices comprising a MoCA network. Test case 220A includes a containerized test set that can be deployed on a device as part of the manufacturing process or downloaded by the Central Office after customer install. Central Office activation of the one or more test cases can occur under human operator control, as part of an expert system initiated test operation, in response to a scheduler process activating the test case, or various combinations thereof. The test cases, such as test case 220A can operate to perform self-testing of the device upon which the test case resides, on other devices on the MoCA network, or combinations thereof. The test case 220A can relay results from conducting the testing to the central office 101.

In one example, the central office 101 identifies a problem with a particular customer installation of a MoCA from a customer contact or data diagnostics and invokes test set 501. Problem reports can include example video displays, data, diagnostics or combinations thereof. Some implementations can include an expert system deployed at the central office 101 to examine video and data problems experienced on the home network and autonomously invoke an appropriate test set. Alternatively, a system operator can invoke discrete tests when the expert system is not used.

The test case 220A accepts input from the central office 101 commanding the container to begin the selected test set 220A. In one application, test set 220A begins analysis of a MoCA network by conducting tests in the test set that generate test traffic to a target device 510 in the MoCA network, retrieve and analyze responses. As testing proceeds, the test set 220A proceeds based on measurements from, or tests performed, on various devices, such as target device 510, in the network under test. While many test sets are configured to run autonomously without human intervention, in some instances the test case 220A can prompt a human operator to enter data or to perform additional actions as needed. The test case 220A can include a test set that addresses a selected problem or a selected test regime. Test case 220A can generate and send traffic to one or more active elements (e.g., 510) in the home network to conduct testing 503. Results from the test(s) are received 505 from the target 510 device under test at a ring buffer 232 implemented in a mapped memory portion of an operating system hosting the containerized test 220A. The test case 220A includes logic to receive 507 responses from the ring buffer 232 thereby reducing latency from returning the results via the operating system of the device hosting test case 220A. As results from the test case 220A isolate network segments and identify issues within the home network under test, the test case 220A can report 509 those results to the central office 101. Unilaterally and automatically, some test case 220A implementations can, via use of rules, choose to run additional test sets to gather further information and/or further isolate the problem. For example, a Wi-Fi test can be performed by the test case 220A to solve a user identified problem with a Wi-Fi device that is not working. The Wi-Fi test may, in a first step, find a fault with the Wi-Fi device in a first test set, or may find no fault with the Wi-Fi device and direct a further test setup to isolate a fault in a cable connecting the Wi-Fi device to the home network.

Deploying Test Sets Using Provisioning

A test set is deployed onto a device being configured as an active element of the home network via a provisioning server. Test sets can be deployed by a manufacturer (or other supply chain actor). The test sets can be provided by a network provider (e.g., Verizon, Comcast or the like) to the manufacturer (or other supply chain actor) of devices under an order for the devices to be configured. Orders can be sent to the manufacturer (or other supply chain actor) via network or the like and provisioned onto devices being configured by a provisioning server.

Figure 4B:
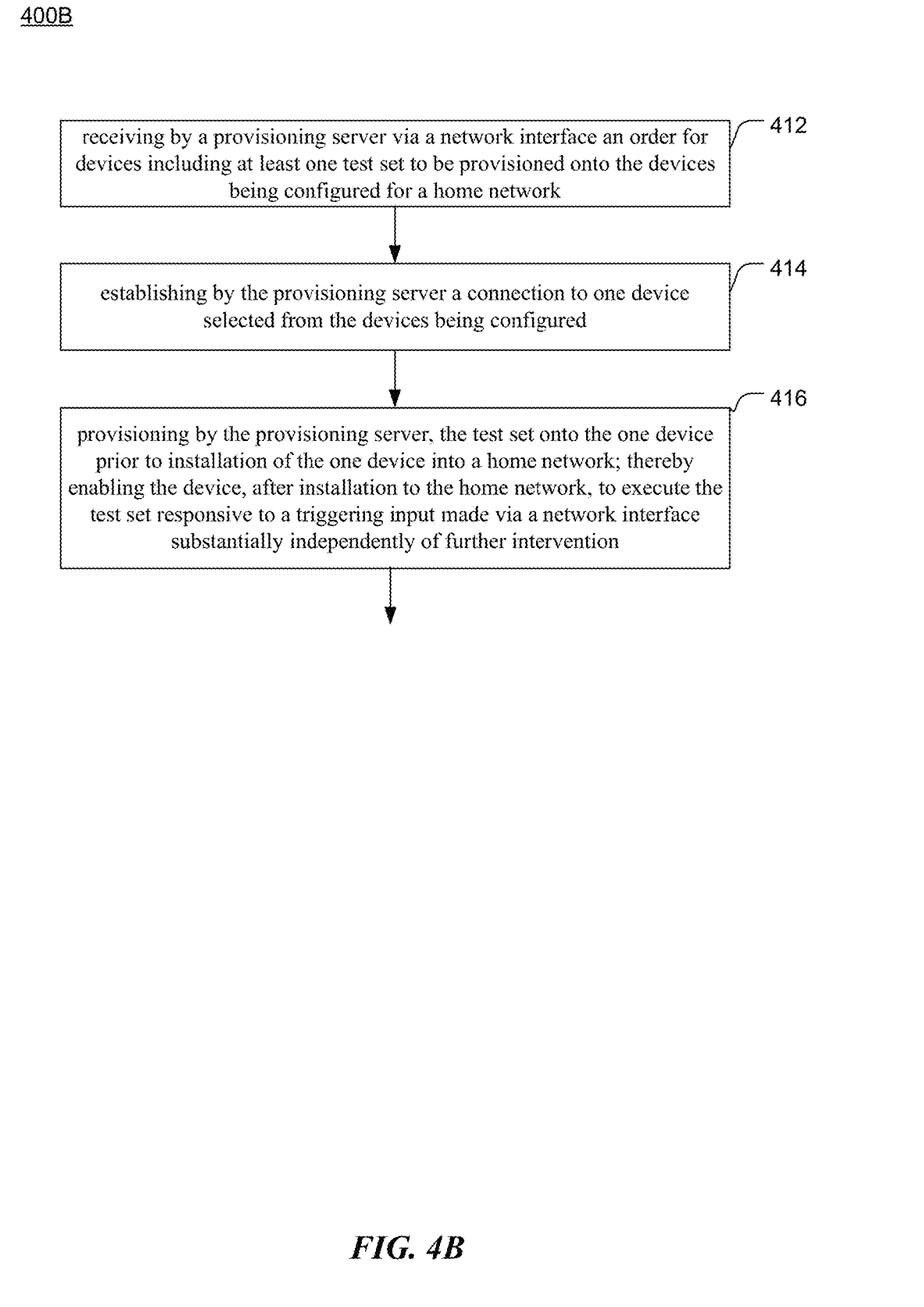
FIG. 4B illustrates a flowchart depicting operation of a provisioning process for provisioning containerized test sets onto devices for use in an MoCA network.

FIG. 4B is a flowchart showing a method 400B depicting operation of a provisioning process for provisioning containerized test sets onto devices being configured as active elements for use in an MoCA network. Flowchart 400B can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 4B. Multiple actions can be combined in some implementations. For convenience, this flowchart is described with reference to the system that carries out a method. The system is not necessarily part of the method.

At action 412, a provisioning server receives via a network interface an order for devices including at least one test set to be provisioned onto the devices being configured for a home network.

At action 414, the provisioning server establishes a connection to one device selected from the devices being configured.

At action 416, the provisioning server provisions the test set onto the one device prior to installation of the one device into a home network. Such provisioning can enable the device, after installation to the home network, to execute the test set responsive to a triggering input made via a network interface substantially independently of further intervention.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 5B:
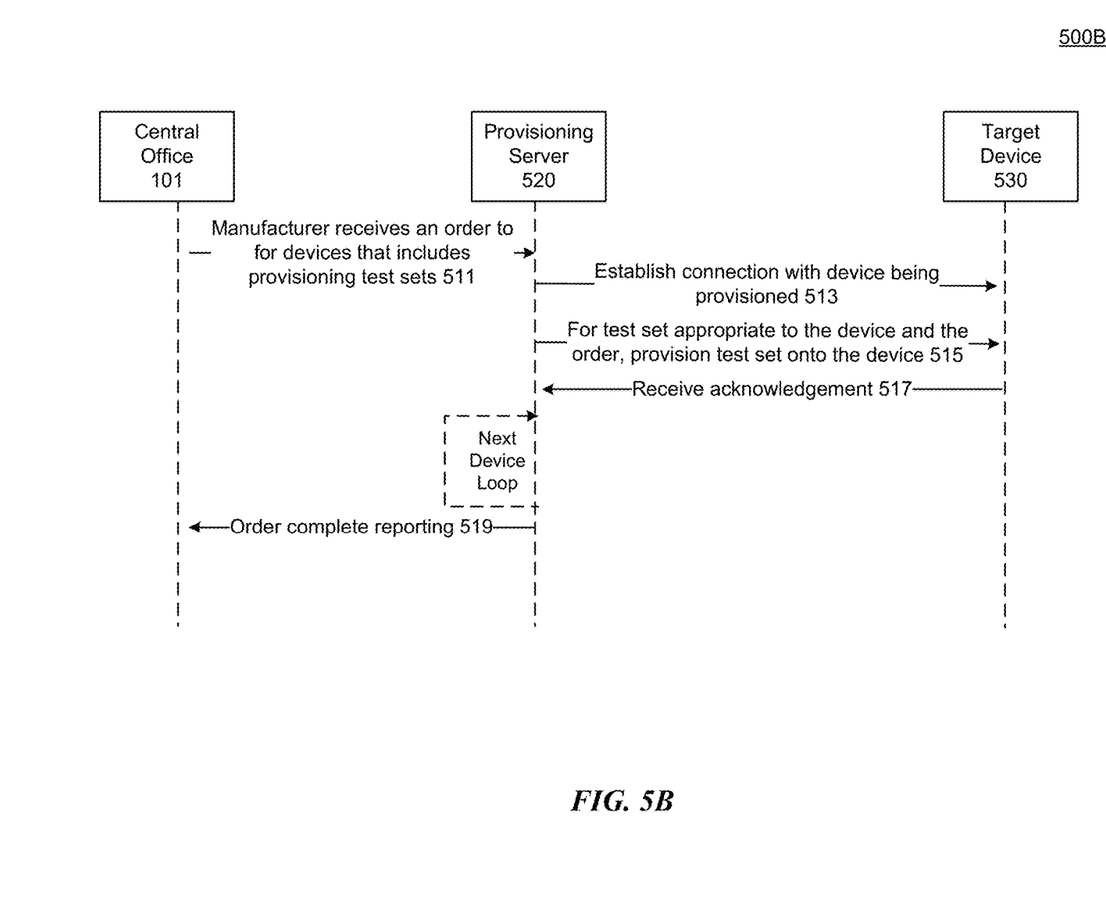
FIG. 5B illustrates one example of messaging during provisioning test sets onto devices as part of manufacturing.

FIG. 5B illustrates one example 500B of messaging during provisioning test sets onto devices as part of manufacturing. Message map 500B includes a sequence of messages between a central office 101, a provisioning server 520, and a target device 510 onto which test sets can be provisioned. The test sets can be provided by a network provider (e.g., Verizon, Comcast or the like) to the manufacturer (or other supply chain actor) of devices under an order for the devices to be configured. Orders can be received 511 from the central office 101 of the network provider by one or more provisioning servers 520 of the manufacturer (or other supply chain actor) via network or the like and provisioned onto devices 530 being configured by a provisioning server. A provisioning server 520 establishes 513 a connection with the target device 530 being provisioned. Once connection is established, the provisioning server 520 provisions 515 the test set appropriate to the device and the order onto the target device 530. When provisioning server 520 detects that provisioning is complete, either through tracking state or receiving an acknowledgement 517 from the target device 530, the provisioning server 520 can perform the process again repeatedly if needed to provision additional devices until the order is completed. Once the order is completed, the provisioning server 520 can report 519 that the order is complete to the central office 101.

Test Process Examples

Figure 4C:
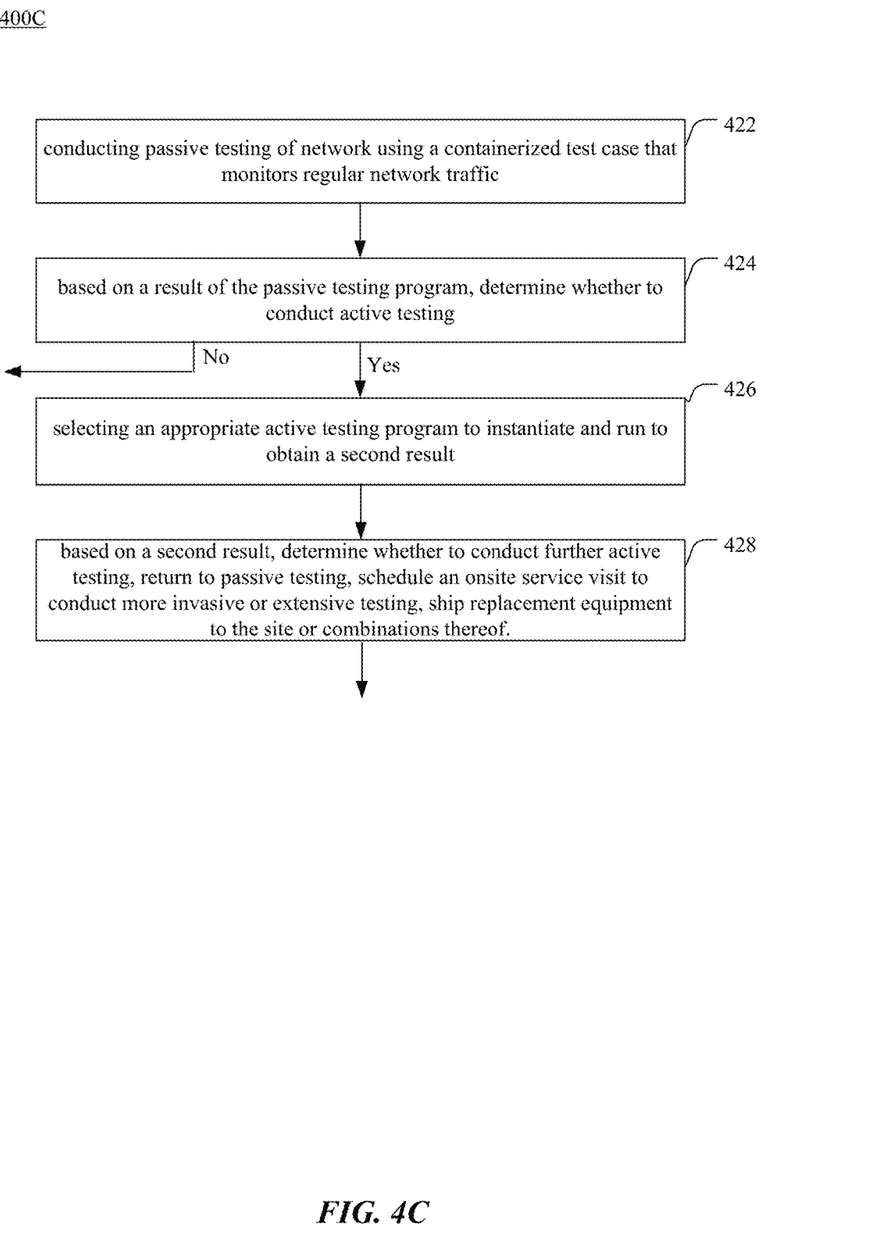
FIG. 4C is a flowchart showing a method 400C depicting an example operation of a testing process implementable using containerized test sets onto devices being configured as active elements for use in an MoCA network.

FIG. 4C is a flowchart showing a method 400C depicting an example operation of a testing process implementable using containerized test sets onto devices configured as active elements for use in an MoCA network. Flowchart 400C can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 4C. Multiple actions can be combined in some implementations. For convenience, this flowchart is described with reference to the system that carries out a method. The system is not necessarily part of the method.

At action 422, a passive testing program is conducted. Passive testing of the network can be conducted using a containerized test case that monitors regular network traffic (e.g., does not generate specific test traffic). Passive monitoring can be initiated at installation, in response to a triggering event, such as a scheduler process activation, or occurrence of specific detected events affecting the network (e.g., installation of new equipment) or combinations thereof.

At action 424, based on a result of the passive testing program, a determination is made whether to conduct active testing.

At action 426, if it is determined to conduct active testing, an appropriate active testing program is instantiated and run to obtain a second result.

At action 428, based on the second result, a determination can be made whether to conduct further active testing, return to passive testing, schedule an onsite service visit to conduct more invasive or extensive testing, ship replacement equipment to the site or combinations thereof. Such flexible and layered testing architectures provide the device, after installation to the home network, with the ability to execute the test set(s) responsive to one or multiple triggering inputs, detection of event(s) or combinations thereof.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

In an example implementation, a new network component is installed to the network. The network component can be an upgrade, new installation or a replacement of a prior failing component. A determination can be made to conduct passive testing program for some period of time to verify the performance of the new component. For example, a component failure can be identified using active testing program; one or more failing components can be replaced and a passive testing program initiated to verify the service has successfully repaired the problem by replacing the unit.

Computer System

Figure 6:
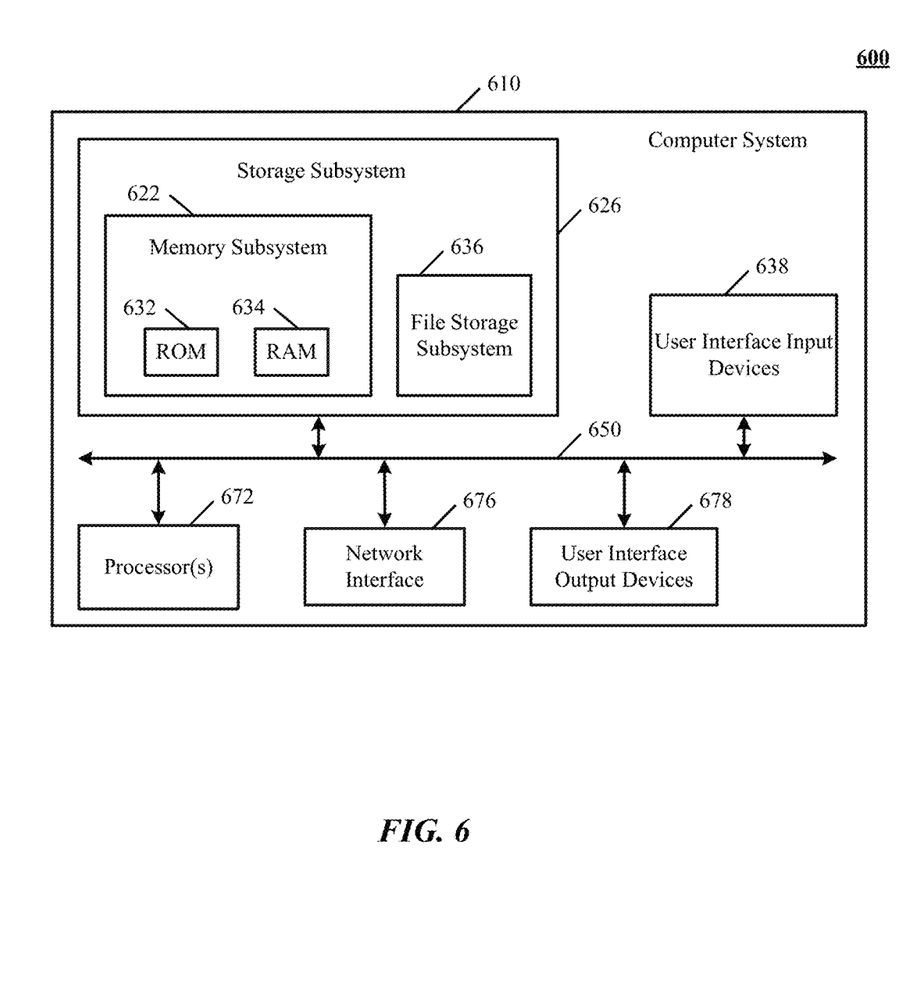
FIG. 6 illustrates a block diagram of hardware implementation for an example MoCA device.

FIG. 6 is a block diagram of an example computer system 600 that can implement device hardware 210 of FIG. 2. FIG. 6 is a block diagram of an example networked device, implemented as a computer system according to one implementation. The processor can be an ASIC or RISC processor. It can be an FPGA or other logic or gate array. It can include graphic processing unit (GPU) resources. Computer system 610 typically includes at least one processor 672 that communicates with a number of peripheral devices via bus subsystem 650. These peripheral devices may include a storage subsystem 626 including, for example, memory devices and a file storage subsystem, user interface input devices 638, user interface output devices 678, and a network interface subsystem 676. The input and output devices allow user interaction with computer system 610. Network interface subsystem 676 provides an interface to outside networks, including an interface to corresponding interface devices in other computer systems.

User interface input devices 638 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 610.

User interface output devices 678 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules and methods described herein. These software modules are generally executed by processor 672 alone or in combination with other processors.

Memory 622 used in the storage subsystem can include a number of memories including a main random access memory (RAM) 634 for storage of instructions and data during program execution and a read only memory (ROM) 632 in which fixed instructions are stored. A file storage subsystem 636 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 636 in the storage subsystem 626, or in other machines accessible by the processor.

Bus subsystem 650 provides a mechanism for letting the various components and subsystems of computer system 610 communicate with each other as intended. Although bus subsystem 650 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as one example. Many other configurations of computer system 610 are possible having more or fewer components than the computer system depicted in FIG. 6.

Particular Implementations

In one implementation, a method of removing latency in performance tests conducted on an in home network by deployable containerized tests is described. The method can be used to diagnose faults in a multimedia over coax alliance (MoCA) local area network (LAN) coupled to a wide area network (WAN) using devices already existing as part of the MoCA network, e.g., without the addition of special purpose test devices. In one implementation, existing device(s) on the MoCA network include a processor coupled to a tangible computer readable storage medium that stores computer instructions. The computer instructions, when executed, cause the processor to perform the method. The method includes deploying a test onto an active element of the home network via a network interface. Tests are deployed on the device as part of the manufacturing process or downloaded by a central office via a network connection after installation of the device to the MoCA. Tests can be containerized into an open platform distributed system container. The open platform system container shares a single instance of an operating system with one or more other containers. Executing the test generates traffic that is sent to one or more other active elements in the home network that provide responses to the active element. The responses are retrieved from a ring buffer managed by the operating system of the device hosting the containerized test by directly accessing a mapped memory portion implementing the ring buffer. The retrieving of the responses from the ring buffer by directly accessing the mapped memory portion implementing the ring buffer enables the responses to be retrieved with less latency than retrieving responses using system calls.

In some implementations a container manager can provide interface between the operating system and the open platform distributed system container executing the test. For example, the container manager can provide access to the ring buffer to the test case.

In some implementations the ring buffer can be shared between the operating system and the open platform distributed system container executing the test.

Some implementations also include introducing the test to the home network via a home network access point.

Some implementations also include dispatching a service representative to conduct further testing when the test provides results indicating a need for on-site service.

In some implementations the test can conduct a test of the home network for WiFi interference. In some implementations the test can conduct a test of the home network for packet loss. In some implementations the test can conduct a test of the home network for loopback support. In some implementations the test can conduct a test of the home network for Two-Way Active Measurement Protocol (TWAMP). In some implementations the test can conduct a preemptive testing regimen on the home network. In some implementations, preemptive testing can include packet loss testing, speed tests, and others.

In another implementation, a method of provisioning containerized test sets onto devices being configured as active elements for use in a MoCA network is described. The method can be used to provision tests sets that diagnose faults onto devices for use in a multimedia over coax alliance (MoCA) local area network (LAN) coupled to a wide area network (WAN) as part of the MoCA network, e.g., without the addition of special purpose test devices. In one implementation, a provisioning server includes a processor coupled to a tangible computer readable storage medium that stores computer instructions. The computer instructions, when executed, cause the processor to perform the method. The method includes receiving via a network interface an order for devices including at least one test set to be provisioned onto the devices being configured for a multimedia over coax alliance (MoCA) local area network (LAN). A connection is established to one device selected from the devices being configured according to the order. The test set is provisioned onto the one device prior to installation of the one device into a home network. Such provisioning can enable the device, after installation to the home network, to execute the test set responsive to a triggering input made via a network interface substantially independently of further intervention.

In some implementations the provisioning is performed by a server located at a manufacturer's facility that configures device(s) for use on MoCA networks prior to installation. In some implementations the provisioning is performed by a server located at a third party service provider facility that configures device(s) for use on MoCA networks prior to installation.

In some implementations the order for devices is received from a network provider (e.g., Comcast, Verizon, T-Mobile).

In a further implementation, a method of provisioning devices being configured as active elements for use in a MoCA network is described. The method can be used to provision devices to receive containerized tests sets that diagnose faults for use in a multimedia over coax alliance (MoCA) local area network (LAN) coupled to a wide area network (WAN) as part of the MoCA network, e.g., without the addition of special purpose test devices. In one implementation, a provisioning server includes a processor coupled to a tangible computer readable storage medium that stores computer instructions. The computer instructions, when executed, cause the processor to perform the method. The method includes receiving via a network interface an order for devices including at least one test application manager to be provisioned onto the devices being configured for a multimedia over coax alliance (MoCA) local area network (LAN). A connection is established to one device selected from the devices being configured according to the order. The test application manager is provisioned onto the one device prior to installation of the one device into a home network. Such provisioning can enable the device, after installation to the home network, to execute the test application manager to receive a containerized test case via a network interface responsive to a triggering input.

Some implementations also can enable the device, after installation to the home network, to execute the test application manager to delete the containerized test case and install instead a second containerized test case received via the network interface responsive to a second triggering input.

Some implementations also can enable the device, after installation to the home network, to execute the test application manager to detect a faulty containerized test case installation; and delete the containerized test case at fault.

Some implementations also can enable the device, after installation to the home network to execute the application manager to install instead of the detected containerized test case at fault, a prior containerized test case thereby recovering from the detected containerized test case fault by reverting to a previous containerized test case.

In some implementations the provisioning is performed by a server located at a manufacturer's facility that configures device(s) for use on MoCA networks prior to installation. In some implementations the provisioning is performed by a server located at a third party service provider facility that configures device(s) for use on MoCA networks prior to installation.

In some implementations the order for devices is received from a network provider (e.g., Comcast, Verizon, T-Mobile).

In a yet further implementation, a method of conducting testing using containerized test sets installed to devices configured as active elements for use in a MoCA network is described. The method can be used to conduct testing that diagnoses faults in connections and/or devices used in a multimedia over coax alliance (MoCA) local area network (LAN) coupled to a wide area network (WAN) as part of the MoCA network, e.g., without the addition of special purpose test devices. In one implementation, a passive testing program is conducted using a containerized test case that monitors regular network traffic (e.g., does not generate specific test traffic). Based on a result of the passive testing program, a determination is made whether to conduct active testing. If it is determined to conduct active testing, an appropriate active testing program is instantiated and run to obtain a second result. Based on the second result, a determination can be made whether to conduct further active testing, or return to passive testing, or schedule an onsite service visit to conduct more invasive or extensive testing, or ship replacement equipment to the site or combinations thereof.

In some implementations the passive monitoring is initiated at installation time. In some implementations the passive monitoring is initiated in response to a triggering event. In some implementations the passive monitoring is triggered by a scheduler process activation. In some implementations the passive monitoring is triggered by occurrence of a specific detected event affecting the network. In some implementations the specific event includes installation of new equipment.

CPE WAN Management Protocol (CWMP) and TR-069 Implementations

In an implementation, test cases can be deployed, invoked, changed, deleted or otherwise managed by transactions conforming all or in part with a standardized protocol, such as CPE WAN Management Protocol (CWMP) published by the Broadband Forum as technical specification TR-069 for remote management of end-user devices. The TR-069 describes a protocol that addresses the growing number of different Internet access devices such as modems, routers, gateways, as well as end-user devices which connect to the Internet, such as set-top boxes and VoIP-phones.

Cable Labs Protocol and Linux Implementation Example

In one implementation, containerized tests are configured and deployed according to a protocol standard. A standard setting body called Cable Labs specifies an example protocol for use with Linux and Docker in some implementations. In one implementation, a "Virtual Home Network", is provided that includes moving router functionality into a computing "cloud." Docker implementations can include an API framework to create containers. Linux allows access by a container to hardware for testing.

In some implementations Kubernetes, an environment that executes on Docker provided by Google, or other equivalent environment, can be employed to manage a cluster of Linux containers. Some implementations also include a development environment. Some implementations are compatible with the Apple Mac.

While the present technology is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the technology and the scope of the following claims.

What is claimed is:

1. A method of removing latency in performance tests conducted on a home network by deployable containerized tests, the method including:

deploying a test onto an active element of the home network via a network interface, the test containerized into an open platform distributed system container that shares with one or more other containers a single instance of an operating system;

executing the test to generate traffic and sending the traffic to one or more other active elements in the home network that provide responses to the active element; and retrieving the responses from a ring buffer managed by the operating system by directly accessing a mapped memory portion implementing the ring buffer, whereby the retrieving the responses from the ring buffer by directly accessing the mapped memory portion implementing the ring buffer enables the responses to be retrieved with less latency than retrieving responses using system calls.

2. The method of claim 1, further including a container manager providing interface between the operating system and the open platform distributed system container executing the test.

3. The method of claim 2, wherein the container manager provides access to the ring buffer to the test.

4. The method of claim 1, wherein the ring buffer is shared between the operating system and the open platform distributed system container executing the test.

5. The method of claim 1, further including introducing the test to the home network via a home network access point.

6. The method of claim 1, further including dispatching a service representative to conduct further testing when the test provides results indicating a need for on-site service.

7. The method of claim 1, wherein the test conducts a test of the home network for WiFi interference.

8. The method of claim 1, wherein the test conducts a test of the home network for packet loss.

9. The method of claim 1, wherein the test conducts a test of the home network for loopback support.

10. The method of claim 1, wherein the test conducts a test of the home network for Two-Way Active Measurement Protocol (TWAMP).

11. A system including one or more processors coupled to memory, the memory loaded with computer instructions remove latency in performance tests conducted on a home network by deployable containerized tests, the instructions, when executed on the processors, implement actions comprising:

deploying a test onto an active element of the home network via a network interface, the test containerized into an open platform distributed system container that shares with one or more other containers a single instance of an operating system;

executing the test to generate traffic and sending the traffic to one or more other active elements in the home network that provide responses to the active element; and retrieving the responses from a ring buffer managed by the operating system by directly accessing a mapped memory portion implementing the ring buffer, whereby the retrieving the responses from the ring buffer by directly accessing the mapped memory portion implementing the ring buffer enables the responses to be retrieved with less latency than retrieving responses using system calls.

12. The system of claim 11, further implementing actions comprising providing by a container manager an interface between the operating system and the open platform distributed system container executing the test.

13. The system of claim 12, wherein the container manager provides access to the ring buffer to the test.

14. A non-transitory computer readable storage medium impressed with computer program instructions to remove latency in performance tests conducted on a home network by deployable containerized tests, the instructions, when executed on a processor, implement a method comprising:

deploying a test onto an active element of the home network via a network interface, the test containerized into an open platform distributed system container that shares with one or more other containers a single instance of an operating system;

executing the test to generate traffic and sending the traffic to one or more other active elements in the home network that provide responses to the active element; and retrieving the responses from a ring buffer managed by the operating system by directly accessing a mapped memory portion implementing the ring buffer, whereby the retrieving the responses from the ring buffer by directly accessing the mapped memory portion implementing the ring buffer enables the responses to be retrieved with less latency than retrieving responses using system calls.

15. The non-transitory computer readable storage medium of claim 14, implementing the method further comprising providing by a container manager an interface between the operating system and the open platform distributed system container executing the test.

16. The non-transitory computer readable storage medium of claim 15, wherein the container manager provides access to the ring buffer to the test.

17. The non-transitory computer readable storage medium of claim 14, wherein the ring buffer is shared between the operating system and the open platform distributed system container executing the test.

18. The non-transitory computer readable storage medium of claim 14, implementing the method further including introducing the test to the home network via a home network access point.

19. The non-transitory computer readable storage medium of claim 14, implementing the method further including dispatching a service representative to conduct further testing when the test provides results indicating a need for on-site service.

20. The non-transitory computer readable storage medium of claim 14, wherein the test conducts a test of the home network for WiFi interference.

21. The non-transitory computer readable storage medium of claim 14, wherein, the test conducts a test of the home network for packet loss.

22. The non-transitory computer readable storage medium of claim 14, wherein the test conducts a test of the home network for loopback support.

23. The non-transitory computer readable storage medium of claim 14, wherein the test conducts a test of the home network for Two-Way Active Measurement Protocol (TWAMP).

* * * * *